United States Patent
Greene et al.

(10) Patent No.: US 6,410,619 B2
(45) Date of Patent: *Jun. 25, 2002

(54) METHOD FOR CONDITIONING ORGANIC PIGMENTS

(75) Inventors: Michael J. Greene, Mt. Pleasant, SC (US); Patrick F. McIntyre, Bloomfield Hills; James G. King, Birmingham, both of MI (US); Gregory R. Schulz, Mt. Pleasant, SC (US); Karyn B. Visscher, Voorhees, NJ (US)

(73) Assignees: Bayer Corporation, Pittsburgh, PA (US); E.I. DuPont De Nemours and Company, Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/444,589

(22) Filed: Nov. 22, 1999

(51) Int. Cl.$^7$ ................................................ C09B 67/50
(52) U.S. Cl. .................. 524/88; 106/410; 106/411; 106/412; 106/413; 106/493; 106/494; 106/495; 106/496; 106/497; 106/498
(58) Field of Search ............. 524/88, 96; 106/410, 106/411, 412, 413, 493, 494, 495, 496, 497, 498

(56) References Cited

U.S. PATENT DOCUMENTS

| | | | |
|---|---|---|---|
| 2,456,319 A | 12/1948 | Read ............................. 224/4 |
| 3,806,464 A | 4/1974 | Matrick et al. ............. 252/316 |
| 4,011,202 A | 3/1977 | Ebner et al. ............. 260/75 M |
| 4,293,475 A | 10/1981 | Sidi ..................... 260/29.6 TA |
| 4,369,272 A | 1/1983 | Jaffe ........................... 524/88 |
| 4,597,794 A | 7/1986 | Ohta et al. ..................... 106/20 |
| 4,611,049 A | 9/1986 | Kuratsuji et al. ............ 528/279 |
| 4,734,137 A | 3/1988 | Kasahara et al. ...... 106/308 M |
| 5,219,945 A | 6/1993 | Dicker et al. ................ 525/276 |
| 5,231,131 A | 7/1993 | Chu et al. ................... 524/504 |
| 5,340,909 A | 8/1994 | Doerr et al. ................ 528/276 |
| 5,459,229 A | 10/1995 | Kelsey et al. ................ 528/275 |
| 5,530,043 A | 6/1996 | Zawacky et al. ............ 524/317 |
| 5,599,900 A | 2/1997 | Bhatia ........................ 528/491 |
| 5,614,014 A | 3/1997 | Urban ........................ 106/495 |
| 5,626,662 A | 5/1997 | Urban ........................ 106/497 |
| 5,629,367 A | 5/1997 | Lofftus et al. ................ 524/88 |
| 5,704,556 A | 1/1998 | McLaughlin .................. 241/21 |
| 5,798,433 A | 8/1998 | Schmidt et al. ............. 528/279 |
| 5,859,113 A | 1/1999 | McIntyre et al. ............ 524/460 |

FOREIGN PATENT DOCUMENTS

| | | | |
|---|---|---|---|
| EP | 0 878 516 A2 | 5/1998 | |
| EP | 1 057 877 A1 | 5/2000 | |
| WO | WO 97/23543 | 7/1997 | ........... C08G/63/88 |
| WO | WO 01/04215 A2 | 1/2001 | |

OTHER PUBLICATIONS

Pigment Handbook, vol. III (month unavailable), 1973, pp. 29–35, W. Carr, "Improving the Physical Properties of Pigments—Pigment Elaborations".

Industrial Organic Pigments, (month unavailable), 1993, pp. 205–207, R. B. McKay, "Finishing".

JOCCA (month unavailable), 1989, pp. 89–93, R. B. McKay, "Control of the Application Performance of Classical Organic Pigments".

Rev. Prog. Coloration, vol. 10, (month unavailable), 1979, pp. 25–32, R. B. McKay, "The Development of Organic Pigments with Particular Reference to Physical Form and Consequent Behaviour in Use".

*Primary Examiner*—Kriellion Sanders
(74) *Attorney, Agent, or Firm*—Joseph C. Gil; Thomas W. Roy

(57) ABSTRACT

This invention relates to a process for preparing conditioned organic pigments by
(a) milling a mixture comprising:
  (1) one or more crude organic pigments;
  (2) at least about 0.1% by weight, relative to the organic pigment, of one or more acrylic copolymer dispersants; and
  (3) 0 to about 100 parts by weight, relative to the organic pigment, of a milling liquid in which the organic pigment is substantially insoluble; and
(b) isolating the milled organic pigment.

20 Claims, No Drawings

METHOD FOR CONDITIONING ORGANIC PIGMENTS

BACKGROUND OF THE INVENTION

The present invention relates to processes of preparing conditioned organic pigments with one or more acrylic polymer dispersants.

Crude organic pigments are obtained after chemical synthesis and are generally unsuitable for use as pigments in coating formulations. Consequently, crude organic pigments undergo one or more finishing steps that modify particle size, particle shape, surface characteristics, and/or crystal structure of the pigment in such a way that provides a pigment of good pigmentary quality. See, for example, W. Carr, "Improving the Physical Properties of Pigments" in *Pigment Handbook*, Vol. III (New York: John Wiley & Sons, Inc., 1973), pages 29–35; W. Herbst and K. Hunger, *Industrial Organic Pigments* (New York: VCH Publishers, Inc., 1993), pages 205–207; R. B. McKay, "The Development of Organic Pigments with Particular Reference to Physical Form and Consequent Behavior in Use" in *Rev. Prog. Coloration*, 10, 25–32 (1979); and R. B. McKay, "Control of the application performance of classical organic pigments" in *JOCCA*, 89–93 (1989) herein incorporated by reference. In some finishing processes, one or more of the finishing steps can include a strong mineral acid or caustic alkali, followed by precipitation of the pigment, and/or milling the crude pigment. A pigment conditioning process that avoids a strong acid or caustic step would be desirable because elimination of such a step would significantly reduce environmental and health risks associated with caustic chemicals and lower costs associated with pigment conditioning processes. Crude organic pigments having undergone a pigment conditioning process are called conditioned organic pigments and are typically sold commercially.

Milling methods are known to improve various properties of organic pigments. E.g., U.S. Pat. Nos. 5,614,014, 5,626,662, and 5,704,556. However, milling in the presence of acrylic polymers as specified in the present invention has not previously been described.

Acrylic copolymers have been used to disperse and maintain, in a dispersed state, conditioned organic pigments in coatings and other materials. See U.S. Pat. Nos. 5,859,113 and 5,219,945, as well as U.S. Pat. Nos. 4,293,475, 4,597,794, 4,734,137, 5,530,043, and 5,629,367, herein incorporated by reference. These dispersions are combined with other components (such as resins and other additives) to form paints and other coatings and other materials. Although dispersing agents have been used to disperse conditioned organic pigments in liquid dispersions, very little is known about the use of copolymer dispersants during processes of conditioning crude organic pigments prior to their isolation as dry powders. U.S. Pat. No. 3,806,464 discloses a method for encapsulating pigments with acrylic polymers and U.S. Pat. No. 4,734,137 discloses a method for reprecipitating pigments that have been dissolved in solvents containing caustic alkali and acrylic resins. Neither patent, however, discloses a milling process, a critical feature of the present invention that provides readily dispersible pigments under relatively gentle conditions.

SUMMARY OF THE INVENTION

The present invention relates to a process for making conditioned organic pigments using at least one acrylic copolymer dispersant. In certain embodiments, these processes may avoid the need for the normal processes requiring the use of strong acids having a pH of less than 2. The conditioned organic pigments formed from the processes of the present invention may be used, in part, in pigmented formulations such as coating compositions, paints and printing inks. The process comprises (a) milling a mixture comprising:
  (1) one or more crude organic pigments;
  (2) at least about 0.1 % by weight, relative to the organic pigment, of one or more acrylic copolymer dispersants (preferably containing at least one polymerized monomer having an aromatic functionality in an adsorbing segment); and
  (3) 0 to about 100 parts by weight, relative to the organic pigment, of a milling liquid in which the organic pigment is substantially insoluble; and
(b) isolating the milled organic pigment.

The milling mixture may also include one or more of the following:
  (4) one or more milling additives; and/or
  (5) one or more surface treatment additives.

Upon completion of the milling, one or more of the following may be added to flocculate the milled pigment prior to isolation:
  (6) one or more acids;
  (7) one or more divalent metal salts; and/or
  (8) one or more quaternary ammonium salts.

All pigments produced from the processes of the present invention are highly dispersible and provide enhanced color in wet and/or dried coating systems.

The term "crude organic pigment" as used herein refers to an organic pigment that has not been treated using the process of the present invention. Such crude organic pigments may or may not be modified after chemical synthesis and may or may not have desirable coloristic properties in coatings systems.

The term "conditioned organic pigment" as used herein refers to an organic pigment that is modified by the process of the present invention after chemical synthesis.

DETAILED DESCRIPTION OF THE INVENTION

Processes of the present invention require milling a crude organic pigment or reprocessing of a finished organic pigment with one or more acrylic polymer dispersants, an optional milling liquid, and optionally one or more milling additives, followed by isolation. The components of the milling mixture may be added or combined in any order such that preferably (but not necessarily) all are present at the start of the milling. Suitable milling methods include dry-milling methods, such as jet milling, ball milling, and the like, and wet-milling methods, such as salt kneading, sand milling, bead milling, and the like in a milling liquid. The resultant organic pigments contain readily dispersible individual particles or loosely bound aggregates.

Crude Organic Pigments

Crude organic pigments used in the practice of the present invention include perylenes, quinacridones, phthalocyanines, isoindolines, dioxazines (that is, triphenedioxazines), 1,4-diketopyrrolopyrroles, anthrapyrimidines, anthanthrones, flavanthrones, indanthrones, perinones, pyranthrones, thioindigos, 4,4'-diamino-1,1'-dianthraquinonyl, and azo compounds, as well as substituted derivatives thereof. Preferred organic pigments are aromatic pigments such as perylene, quinacridone, phthalocyanine, isoindoline, and dioxazine pigments. Mixtures, including solid solutions, may also be prepared.

Perylene pigments used in the practice of the present invention may be unsubstituted or substituted. Substituted perylenes may be substituted at imide nitrogen atoms for example, and substituents may include an alkyl group of 1 to 10 carbon atoms, an alkoxy group of 1 to 10 carbon atoms and a halogen (such as chlorine) or combinations thereof. Substituted perylenes may contain more than one of any one substituent. The diimides and dianhydrides of perylene-3,4, 9,10-tetracarboxylic acid are preferred. Crude perylenes can be prepared by methods known in the art. Please review, W. Herbst and K. Hunger, *Industrial Organic Pigments* (New York: VCH Publishers, Inc., 1993), pages 9 and 467–475, H. Zollinger, *Color Chemistry* (VCH Verlagsgessellschaft, 1991), pages 227–228 and 297–298, and M. A. Perkins, "Pyridines and Pyridones" in *The Chemistry of Synthetic Dyes and Pigments*, ed. H. A. Lubs (Malabar, Fla.: Robert E. Krieger Publishing Company, 1955), pages 481–482, incorporated herein by reference.

Phthalocyanine pigments, especially metal phthalocyanines may be used in the practice of the present invention. Although copper phthalocyanines are preferred, other metal-containing phthalocyanine pigments, such as those based on zinc, cobalt, iron, nickel, and other such metals, may also be used. Metal-free phthalocyanines are also suitable but are generally less preferred. Phthalocyanine pigments may be unsubstituted or partially substituted, for example, with one or more alkyl (having 1 to 10 carbon atoms), alkoxy (having 1 to 10 carbon atoms), halogens such as chlorine, or other substituents typical of phthalocyanine pigments. Crude phthalocyanines may be prepared by any of several methods known in the art. They are preferably prepared by a reaction of phthalic anhydride, phthalonitrile, or derivatives thereof, with a metal donor, a nitrogen donor (such as urea or the phthalonitrile itself), and an optional catalyst, preferably in an organic solvent. E.g., W. Herbst and K. Hunger, *Industrial Organic Pigments* (New York: VCH Publishers, Inc., 1993), pages 418–427, H. Zollinger, *Color Chemistry* (VCH Verlagsgessellschaft, 1991), pages 101–104, and N. M. Bigelow and M. A. Perkins, "Phthalocyanine Pigments" in *The Chemistry of Synthetic Dyes and Pigments*, ed. H. A. Lubs (Malabar, Fla.: Robert E. Krieger Publishing Company, 1955), pages 584–587; see also U.S. Pat. Nos. 4,158,572, 4,257,951, and 5,175,282 and British Patent 1,502,884, incorporated herein by reference.

Quinacridone pigments, as used herein, include unsubstituted or substituted quinacridones (for example, with one or more alkyl, alkoxy, halogens such as chlorine, or other substituents typical of quinacridone pigments), and are suitable for the practice of the present invention. The quinacridone pigments may be prepared by any of several methods known in the art but are preferably prepared by thermally ring-closing various 2,5-dianilinoterephthalic acid precursors in the presence of polyphosphoric acid. E.g., S. S. Labana and L. L. Labana, "Quinacridones" in *Chemical Review*, 67, 1–18 (1967), and U.S. Pat. Nos. 3,157,659, 3,256,285, 3,257,405, and 3,317,539.

Isoindoline pigments, which can optionally be substituted symmetrically or unsymmetrically, are also suitable for the practice of the present invention can be prepared by methods known in the art. E.g., W. Herbst and K. Hunger, *Industrial Organic Pigments* (New York: VCH Publishers, Inc., 1993), pages 398–415. A particularly preferred isoindoline pigment, Pigment Yellow 139, is a symmetrical adduct of iminoisoindoline and barbituric acid precursors. Dioxazine pigments (that is, triphenedioxazines) are also suitable organic pigments and can be prepared by methods known in the art. E.g., W. Herbst and K. Hunger, *Industrial Organic Pigments* (New York: VCH Publishers, Inc., 1993), pages 534–537. Carbazole Violet 23 is a particularly preferred dioxazine pigment.

Suitable starting pigments include organic pigments having large particle sizes that do not exhibit good dispersibility or coloristic properties. Such large-particle pigments, even when pretreated with conditioning agents (including acrylic copolymers (1)), do not exhibit significantly improved properties if subsequently collected and only then milled by conventional methods. However, the dispersibility of even pretreated large-particle pigments can be improved by milling in the presence of acrylic copolymers according to the present invention.

Suitable starting pigments also include organic pigments in which the particles, although smaller, are aggregated and thus do not exhibit optimum dispersibility or coloristic properties. For example, many processes that reduce particle size, such as dry milling (e.g., jet milling, ball milling, and the like), can produce aggregates having poor dispersibility and coloristic properties. The process of the present invention can be used to convert such aggregated pigments to readily dispersible forms.

The process of the present invention allows the preparation of pigments having smaller particle sizes than would ordinarily be expected to provide good coloristic or physical properties. It has now been found that pigments prepared by the process of the present invention with very fine particle sizes exhibit excellent coloristic properties and an advantageous combination of dispersibility and rheological properties.

Copolymer Dispersants

Conditioned organic pigments are prepared by the process of the present invention by milling mixtures containing crude organic pigments and acrylic copolymer dispersants. The concentration of the acrylic copolymer dispersant is at least about 0.1 percent by weight (preferably 0.1 to 100 percent by weight, most preferably 2 to 20 percent by weight) relative to the crude organic pigment. Acrylic copolymer dispersants preferably used include at least one adsorbing segment and at least one stabilizing segment. Not to be held to any particular theory, it is thought that adsorbing segments function, in part, to attach a copolymer dispersant to an organic pigment while stabilizing segments function, in part, to maintain dispersion stability of a pigment in a liquid.

An adsorbing segment preferably includes at least one polymerized monomer having an aromatic functionality, more preferably a benzyl functionality. Monomers including an aromatic functionality used to prepare an acrylic polymer dispersant of the present invention are selected, in part, on their theoretical ability to bind to an aromatic pigment. Such a polymerized monomer is prepared from monomers including an aromatic acrylate (such as benzyl acrylate, napthyl acrylate, phenoxy acrylate), aromatic methacrylate (such as benzyl methacrylate, napthyl methacrylate, phenoxy acrylate) or combinations of monomers including an aromatic acrylate. An adsorbing segment may include other polymerized monomers, in addition to polymerized monomers containing an aromatic functionality, and are prepared from monomers such as alkyl (meth)acrylates, alkylaminoalkyl methacrylate monomers having 1 to 4 carbon atoms in the alkyl group (such as dimethylaminoethyl methacrylate, diethylaminoethyl methacrylate, dipropylaminoethyl methacrylate, dibutylaminoethyl methacrylate, acrylate esters thereof), or combinations thereof.

A stabilizing segment includes polymerized monomers prepared from monomers such as alkyl(meth)acrylate, methacrylic acid, acrylic acid, silane blocked hydroxy alkyl (meth)acrylate monomers that are subsequently unblocked by a reaction with alcohol or water, or combinations thereof. These hydroxy functionalized monomers may be incorporated to provide sites that allow for crosslinking the copolymer dispersant into the coating system, which in turn enables the dispersant to become part of the network structure and also improves coating adhesion.

Suitable alkyl(meth)acrylates that may be used in the practice of the present invention include those having 1 to 12 carbons in the alkyl group such as methyl acrylate, ethyl acrylate, propyl acrylate, isopropyl acrylate, butyl acrylate, pentyl acrylate, hexyl acrylate, 2-ethylhexyl acrylate, isopropyl acrylate, butyl acrylate, pentyl acrylate, hexyl acrylate, 2-ethylhexyl acrylate, nonyl acrylate, lauryl acrylate, methyl methacrylate, ethyl methacrylate, propyl methacrylate, isopropyl methacrylate, butyl methacrylate, pentyl methacrylate, hexyl methacrylate, 2-ethylhexyl methacrylate, nonyl methacrylate, lauryl methacrylate and the like and any mixtures thereof.

An acrylic polymer dispersant of the present invention has a number average molecular weight of about 4,000 to about 25,000 (preferably about 5,000 to about 15,000). An adsorbing segment has a number average molecular weight of about 2,000 to about 10,000 (preferably about 4,000 to about 7,000). A stabilizing segment has a number average molecular weight of about 2,000 to about 15,000 (preferably about 4,000 to about 7,000).

The location of an adsorbing segment and a stabilizing segment in an acrylic polymer dispersant may vary depending upon the structure of the acrylic copolymer dispersant. Acrylic polymer dispersants of the present invention may be random, block, or graft copolymers, preferably block copolymers. A block copolymer of the present invention may have an AB, ABA, or ABC structure, for example. At least one of the blocks A, B or C must be an adsorbing segment. At least one of the blocks A, B, or C must be a stabilizing segment. A block copolymer of the present invention may include an additional third segment.

Graft copolymer dispersants of the present invention have a backbone segment and a side chain segment. Either a backbone segment or a side chain segment must be an adsorbing segment. Either a backbone segment or a side chain segment must be a stabilizing segment. Preferably a backbone segment is an adsorbing segment and a sidechain segment is a stabilizing segment.

Random copolymer dispersants of the present invention have both adsorbing segments and stabilizing segments randomly placed in a polymer dispersant chain.

Acrylic copolymer dispersants of the present invention may be prepared using the Group Transfer Polymerization ("GTP") method reported by Webster in *J. Amer. Chem. Soc.*, 105, 5706 (1983); the anionic polymerization method reported by Morton in *Anionic Polymerization: Principles and Practice* (New York: Academic Press, 1983); the ring-opening polymerization method as reported in *Ring Opening Polymerization*, Vol. 1, edited by K. J. Ivin and T. Saegusa (New York: Elsevier Applied Science Publishers, 1984), page 461; or the Special Chain Transfer ("SCT") method reported in U.S. Pat. No. 5,231,131.

Milling Liquids

The process of the present invention involves a milling mixture comprising 5 one or more crude organic pigments, one or more acrylic copolymer dispersants, and an optional milling liquid. The quantity of the milling liquid is about 0 to about 100 parts by weight (preferably 1 to 15 parts by weight) relative to the organic pigment.

Suitable milling liquids, if used at all, include water; lower aliphatic alcohols (such as methanol), ketones and ketoalcohols (such as acetone, methyl ethyl ketone, and diacetone alcohol), amides (such as dimethylformamide and dimethylacetamide), ethers (such as tetrahydrofuran and dioxane), alkylene glycols and triols (such as ethylene glycol and glycerol), and other organic liquids known in the art; and mixtures thereof. Other liquids can be used but are generally less preferred.

Milling Additives

Milling additives may also be added in conventional quantities (e.g., 0. 1% to 50% by weight relative to the pigment) to a milling mixture. Examples of suitable milling additives include inorganic compounds (such as metal salts), surfactants, dispersants (such as sulfonamide, carboxamide, or aminoalkyl derivatives of organic pigments, particularly of perylenes, phthalocyanines, or quinacridones), wetting agents, defoamers, grinding aids, latices, or mixtures thereof. In certain cases, one or more inorganic and/or organic bases may be added, especially if the acrylic copolymer dispersant(s) contain acidic functional groups.

Surface Treatment Additives

Before, during, or after milling, a pigment can be treated with a suitable surface treatment additive that may be added directly to the milling mixture. Suitable surface treatment additives include acrylic copolymers; fatty acids (such as stearic acid or behenic acid); corresponding amides, esters, or salts thereof (such as magnesium stearate, zinc stearate, aluminum stearate, or magnesium behenate); resin acids (such as abietic acid, rosin soap, hydrogenated or dimerized rosin); $C_{12}$–$C_{18}$-paraffin-disulfonic acids; sulfonated dicarboxylic acids; corresponding esters or amides thereof (such as sulfosuccinates, sulfosuccinamates, and derivatives thereof); lkyl phosphates and phosphonates; long chain fatty amines (such as laurylamine or tearylamine); polyamines (such as polyethylenimines); quaternary ammonium ompounds (such as tri[($C_1$–$C_4$ alkyl)benzyl]ammonium salts); alkylphenols; alcohols and diols (such as stearyl alcohol and dodecane-1,2-diol); alkoxylated fatty acids and amides, alkoxylated alcohols, alkoxylated alkylphenols, and glycol esters; waxes (such as polyethylene wax); plasticizers (such as epoxidized soya bean oil); or combinations thereof. Such additives can be incorporated in amounts ranging from about 0.1 to 20 percent by weight (preferably 0.1 to 5 percent by weight), based on the amount of the surfactants according to the invention.

Prior to the milling step, the crude organic pigment (or mixture of organic pigments), acrylic copolymer dispersant (or mixture thereof), milling liquid (or mixture thereof), and, if necessary, one or more milling additives and/or one or more surface treatment additives may be combined in any order. Preferably, all such components are combined prior to the milling such that the total solids content in the milling mixture is between 0 and 100 percent by weight (most preferably 15 to 50 percent by weight).

Milling is carried out using known dry milling methods, such as jet milling, ball milling, and the like, or known wet-milling methods, such as salt kneading, sand milling, bead milling, and the like. Although the particular milling apparatus is generally not critical, suitable mills include horizontal mills (for example, Eiger mills, Netzsch mills, and Super mills), vertical mills, ball mills, attritors, vibratory mills, and the like containing various grinding media. Suitable grinding media include salt, sand, glass beads (such as barium titanate, soda lime, or borosilicate beads), ceramic beads (such as zirconia, zirconium silicate, and alumina beads), or metal beads (such as stainless steel, carbon steel, and tungsten carbide beads). Suitable mills and methods are discussed, for example, in U.S. Pat. No. 5,704,556 and *Pigment Handbook*, Vol. III (New York: John Wiley & Sons, 1973), page 396. Regardless of the particular milling method used, the mixture of the crude organic pigment, the acrylic copolymer dispersant, and the optional components is milled until the desired particle size and particle distribution are obtained. Depending on the specific mill used, milling is generally carried out at a temperature of about 0° C. to about 60° C. (preferably 15° C. to 40° C.). Milling times generally depend on the quantities being milled and the volume of the mill. For example, when using a mill having an empty milling chamber volume of 300 to 500 ml, a slurry containing about 300 g of pigment at a solids content of 20 to 25%, is generally milled for about three to about eight hours (typically about five hours).

After the milling step is completed, the pigment or milling mixture can be treated with an optional solvent treatment. Suitable solvents include water; inorganic acids (such as sulfuric or phosphoric acid); organic acids (such as formic or acetic acid); alcohols (such as methanol, ethanol, or ethylene glycol); cyclic or open-chain ethers (such as dioxane, tetrahydrofuran, ethylene glycol monoalkyl or dialkyl ethers, and oligo- and polyglycol ethers); ketones (such as acetone or methyl ethyl ketone); aromatics (such as toluene, xylene, chlorobenzene, nitrobenzene, or chloronaphthalene); esters (such as methyl benzoate, dimethyl phthalate, dimethyl succinate, or methyl salicylate); amides (such as formamide, dimethylformamide, or N-methylpyrrolidone); and mixtures thereof. Solvent treatments are generally carried out at temperatures between about 10° C. and about 200° C. (preferably at elevated temperatures in the range of 60° C. to 145° C.).

After the milling, an acid may be added to the milling mixture to promote flocculation (and thereby facilitate isolation), as well as to improve the binding of the acrylic polymer to the pigment surface, particularly for acrylic polymers having acid groups. Suitable such acids include dilute mineral acids (such as hydrochloric, sulfuric, phosphoric, or mixtures thereof) and organic acids (such as acetic, formic or mixtures thereof). Inorganic salts (primarily divalent metal salts), organic salts (primarily quaternary ammonium salts), or mixtures thereof can also be used to flocculate the milled pigment to aid in isolation.

After milling, conditioned pigment maybe separated from the milling mixture by one or more isolation methods known in the art. Filtration, followed by washing to remove residual salts and solvent, is the preferred separation method. Other collection methods known in the art, such as tray drying, spray drying, spin flash drying, lyophilization, centrifugation, or even simple decantation are also suitable isolation methods. Such methods can be used individually or in combination.

Pigments conditioned according to the present invention are suitable for many different pigment applications, particularly in view of their exceptional dispersibility, their light stability, and their migration properties. For example, the conditioned pigments can be dried and used as components in coating systems. Conditioned pigments prepared by the processes of the present invention are readily dispersible, for example, in aqueous coating systems. The conditioned pigments may be mixed with other materials such as pigment formulations (including inorganic white pigments, such as titanium dioxide (rutile), cement, inorganic pigments, flushed pastes with organic liquids or pastes, pigment dispersions with water, dispersants, and, if appropriate, preservatives), coating compositions (including paints, preferably automotive paint, electronic coating paints, physically or oxidatively drying lacquers, stoving enamels, reactive paints, two-component paints, solvent- or water-based paints, emulsion paints for weatherproof coatings and distempers, printing ink, including ink jet inks, or colored paper).

The conditioned pigments of the present invention are suitable for use with macromolecular materials, especially synthetically produced macromolecular materials. Examples include plastic materials, such as polyvinyl chloride, polyvinyl acetate, and polyvinyl propionate; polyolefins, such as polyethylene and polypropylene; high molecular weight polyamides; polymers and copolymers of acrylates, methacrylates, acrylonitrile, acrylamide, butadiene, or styrene; polyurethanes; and polycarbonates. Other suitable macromolecular substances include those of a natural origin, such as rubber; those obtained by chemical modification, such as acetyl cellulose, cellulose butyrate, or viscose; or those produced synthetically, such as polymers, polyaddition products, and polycondensates. Materials containing conditioned pigments of the present invention may have any desired shape or form, including molded articles, films, and fibers.

The following examples further illustrate the present invention and are not intended to limit either the spirit or scope of the present invention. Those skilled in the art will readily understand that other variations exist. Unless otherwise noted, all temperatures are degrees Celsius, all percentages and parts are percentages by weight and parts by weight, respectively.

EXAMPLES

The process of making conditioned pigments of the present invention involves milling a milling mixture comprising a crude organic pigment, an acrylic copolymer dispersant, and a milling liquid. Examples of polymer dispersants used in the present invention are provided below. All molecular weights referred to herein were determined by gel permeation chromatography ("GPC") using a polystyrene standard.

Polymer Dispersant 1

Polymer Dispersant 1 is an AB block copolymer containing monomers including benzyl functionality and amine functionality in the adsorbing segment of the polymer dispersant and prepared using the GTP method.

To a 5-liter flask equipped with an agitator, condenser, heating mantle, nitrogen inlet, thermocouple and an addition port, were added 1,600 g of tetrahydrofuran and 3.8 g of p-xylene, followed by 0.6 mL of a 1.0 M solution of a catalyst, tetrabutylammonium m-chlorobenzoate in acetonitrile. 32.5 g of a 0.140 M solution of an initiator, 1,1-bis (trimethylsiloxy)-2-methylpropene, were injected into the flask. Feed I, consisting of 0.6 mL of a 1.0 M solution of tetrabutylammonium m-chlorobenzoate in acetonitrile, was added over 200 minutes. Feed II, consisting of 265.0 g (1.67 mol) of trimethylsilyl methacrylate, 298.0 g (2.10 mol) of butyl methacrylate, 140.0 g (1.40 mol) of methyl methacrylate, and 141.0 g (0.70 mol) of trimethylsiloxyethyl methacrylate, was added over a 45 minute period. One hundred minutes after Feed II was completed, over 99% of the monomers had reacted. Feed III, consisting of 616.0 g (3.46 mol) of benzyl methacrylate, and 154.0 g (0.98 mol) of dimethylaminoethyl methacrylate, was added over 30 minutes. After 400 minutes, 150 g of methanol was added to the resulting reaction mixture to quench the reaction and deblock the hydroxy and acid monomers and solvent distillation was started. During the first stage of distillation, 400.0 g of solvent was removed. 100 g of methanol was added and an additional 200.0 g of solvent was distilled off. The resulting polymer solution had a solids content of 50% and the polymer had the following composition: benzyl methacrylate ("BZMA")/dimethylaminoethyl methacrylate ("DMAEMA")//butyl methacrylate ("BMA")/methyl methacrylate ("MMA")/hydroxyethyl methacrylate ("HEMA")/methacrylic acid ("MAA") in a monomer ratio of 25/7//15/10/5/12. The polymer had a weight average molecular weight of 10,300, a number average molecular weight of 9,400, and a polydispersity of 1.1. The polymer solution was diluted with a 1:1 mixture of deionized water and isopropyl alcohol to a solids content of 27% prior to use.

Polymer Dispersant 2

Polymer Dispersant 2 is a graft copolymer containing polymerized monomers containing benzyl functionality in its backbone and was prepared by the SCT method. Polymer Dispersant 2 was prepared in two steps. The first step consists of the formation of a macromonomer (Macromonomer I). The second step consists of reacting the macromoner with other constituents to form the macro branched copolymer. The macromonomer is made by charging the following constituents into a reactor equipped with a thermometer, stirrer, dropping funnels, and reflux condenser under a nitrogen blanket.

Macromonomer I: BMA/MMA/HEMA/MAA (40/28/12/20)

Macromonomer I was prepared using the following components. Quantities are given in parts by weight.

| Portion I | |
|---|---|
| Methyl methacrylate monomer | 64.69 |
| Butyl methacrylate monomer | 92.41 |
| Hydroxyethyl methacrylate monomer | 18.48 |
| Methacrylic acid monomer | 30.80 |
| Isopropanol | 259.80 |
| Portion II | |
| Diaquabis(borondifluorodiphenyl-glyoximato) cobalt(II) ("Co(DPG-BF.sub.2") | 0.01 |
| Isopropanol | 18.76 |
| 2,2-Azobis(2-methylbutylnitrile) | 0.20 |
| Methyl ethyl ketone | 8.04 |
| Portion III | |
| Isopropanol | 15.60 |
| Portion IV | |
| Methyl ethyl ketone | 24.06 |
| Isopropanol | 56.14 |
| DMG Colbalt 3 | 0.03 |
| VAZO 052 | 2.20 |
| Portion V | |
| Methyl methacrylate monomer | 46.20 |
| Butyl methacrylate monomer | 61.61 |
| Hydroxyethyl methacrylate monomer | 27.72 |
| Methacrylic acid monomer | 46.20 |
| Total | 769.87 |

Portion I was heated to reflux in about 20 minutes. Portion II was added and the composition was held at reflux for about 5 minutes. Portion III was used as a rinse for the container and feed lines from Portion II. Portions IV and V were added simultaneously while the reaction was held at reflux. The addition of Portion IV took 330 minutes to complete and addition of Portion V took 240 minutes to complete.

After adding Portion IV and Portion V, the reaction continued for additional 15 minutes at reflux and was then cooled to room temperature.

The resulting macromonomer solution had the composition of 40% butyl acrylate ("BA"), 28% MMA, 12% HEMA, and 20% MAA. The solvent was removed under vacuum and the macromonomer was used below to form the graft copolymer. The macromonomer had a solids content of 47.8%, a number average molecular weight of 1,888, a weight average molecular weight of 3,286, and a polydispersity of 1.74. The macromonomer was neutralized with 2-amino-2-methyl-1-propanol (available as AMP-95 from Angus Chemical) prior to conducting the reaction.

The graft copolymer was formed by charging a reactor equipped with a stirrer, thermocouple, and condenser under a nitrogen blanket using the following components. Quantities are given in parts by weight.

| Portion I | |
|---|---|
| Macromonomer I (AMP-95 neutralized) | 4112.58 |
| Isopropanol | 300.00 |
| Portion II (macromonomer neutralization) | |
| Aminomethylpropanol | 407.14 |
| Isopropanol | 0.00 |
| Portion III | |
| Benzyl methacrylate | 111.77 |
| n-Butyl acrylate | 186.29 |
| Dimethylaminoethyl methacrylate | 74.51 |
| Portion IV | |
| Isopropanol | 200.00 |
| LUP 11 | 50.00 |
| Portion V | |
| Benzyl methacrylate | 816.66 |
| n-Butyl acrylate | 1366.10 |
| Dimethylaminoethyl methacrylate | 546.44 |
| Isopropanol | 0.00 |
| Portion VI | |
| VAZO 52 | 25.95 |
| Isopropanol | 261.00 |
| Methyl ethyl ketone | 50.00 |
| Portion VII | |
| VAZO 52 | 51.90 |
| Isopropanol | 203.00 |
| Methyl ethyl ketone | 50.00 |
| Total | 8816.34 |

Portion I was heated to reflux over a 20 minute period. Portion II was charged to the reactor over 2 to 3 minutes to neutralize the macromonomer. The reaction was held at reflux for 10 minutes. Portion III was charged to the reactor over 2 to 3 minutes and the reaction held at reflux for 10 minutes. Portion IV was added in two stages with 10 minute holds at reflux to react with the cobalt left on the macromonomer. Portion V was charged to reactor at a feed rate of 6 g/min for 180 minutes. Portion VI (the VAZO 52 initiator) was added at a feed rate of 0.557 g/min for 240 minutes. Portion VII (final quantity of initiator) was added at 8.0 g/min for 15 minutes.

The resulting branched copolymer solution had a solids content of 63% and the polymer had the following composition: [60] BA /BZMA/DMAEMA (50/30/20)//[40] BMA/MMA/HEMA/MAA (40/28/12/20). The polymer had a weight average molecular weight of 6,000, a number average molecular weight of 3,500, and polydispersity of 1.7.

Polymer Dispersant 3

Polymer Dispersant 3 is a 20% higher number average molecular weight version of Polymer Dispersant 1. This polymer was prepared using the GTP method as described for Polymer Dispersant 1. The higher molecular weight was achieved by using 20% less (or 26.0 g instead of 32.5 g) of a 0.140 M solution of 1,1 -bis(tri-methylsiloxy)-2-methylpropene initiator. The polymer had the following composition: BZMA/DMAEMA//BMA/MMA/HEMA/MAA in a monomer ratio of 31/9//9/13/6/15. The polymer had a weight average molecular weight of 12,800, a number average molecular weight of 11,000, and a polydispersity of 1.1. The polymer solution was diluted with a 1:1 mixture of deionized water and isopropyl alcohol to a solids content of 35% prior to use.

Polymer Dispersant 4

Polymer Dispersant 4 is a 20% lower number average molecular version of Polymer Dispersant 1. This polymer was prepared using the GTP method as described for Polymer Dispersant 1. The lower molecular weight was achieved by adding 20% more (or 40.6 g instead of 32.5 g) of a 0.140 M solution of 1,1-bis(trimethylsiloxy)-2-methylpropene initiator. The polymer had the following composition: BZMA/DMAEMA//BMA/MMA/HEMA/MAA in a monomer ratio of 20/6//12/8/4/9. The polymer had a weight average molecular weight of 8,240, a number average of 7,500, and a polydispersity of 1.1. The polymer solution was diluted with a 1:1 mixture of deionized water and isopropyl alcohol to a solids content of 35% prior to use.

Polymer Dispersant 5

Polymer Dispersant 5 is a 20% less acid version of Polymer Dispersant 1. This polymer was prepared using the GTP method as described for Polymer Dispersant 1. 15 The 20% lower acid was achieved by adding 20% less (or 212 g instead of 265 g) of trimethylsilyl methacrylate monomer in Feed II. Polymer Dispersant 5 had the following composition: BZMA/DMAEMA//BMA/MMA/HEMA/MAA in a monomer ratio of 25/7//15/10/5/9. The polymer had a weight average molecular weight of 10,000, a number average of 9,100, and a polydispersity of 1.1.

Polymer Dispersant 6

Polymer Dispersant 6 is a 20% higher acid version of Polymer Dispersant 1. This polymer was prepared using the GTP method as described for Polymer Dispersant 1. The 20% higher acid was achieved by adding 20% more (or 320 g instead of 265 g) of trimethylsilyl methacrylate monomer in Feed II. Polymer Dispersant 6 had the following composition: BZMA/DMAEMA//BMA/MMA/HEMA/MAA in a monomer ratio of 25/7//15/10/5/15. The polymer had a weight average molecular weight of 10,600, a number average of 9,600, and a polydispersity of 1.1. The polymer solution was diluted with a 1:1 mixture of deionized water and isopropyl alcohol to a solids content of 35% prior to use.

Polymer Dispersant 7

Polymer Dispersant 7 is similar to Polymer Dispersant 1 but lacks the amine functionality in the A segment of the block. This polymer was prepared using the GTP method as described for Polymer Dispersant 1. The elimination of amine from the polymer was achieved by removal of 141.0 g of trimethylsiloxyethyl methacrylate monomer in Feed II. Polymer Dispersant 7 had the following composition: BZMA//BMA/MMA/HEMA/MAA in a monomer ratio of 3O/15/1015115. The polymer had a weight average molecular weight of 10,200, a number average of 9,300, and a polydispersity of 1.1.

Polymer Dispersant 8

Polymer Dispersant 8 is a graft copolymer similar to Polymer Dispersant 2 and is prepared in the same manner. The macromonomer used in pigment stabilization, instead of being 100% anionic, is a blend of anionic and nonionic arms. The anionic macromonomer is BMA//MMA/HEMA/MAA (40/28/12/20). The nonionic macromonomer is Bisomer 20W, which is polyethylene glycol methacrylate of 2000 molecular weight. The resulting branched copolymer is 42% solids in a solution of water, methyl ethyl ketone, and isopropanol. The polymer has the following composition: [60] BA/BZMA/DMAEMA (50/30/20)//[40] BMA/MMA/HEMA/MAA (40/28/12/20) Bisomer 20W (50/50).

Polymer Dispersant 9

Polymer Dispersant 9 is an AB block polymer similar to Polymer Dispersant 4 but is prepared using the SCT method described for Polymer Dispersant 2. The resulting polymer solution had a solids content of 35% and the following composition: benzyl acrylate/DMEAMA//BA/methyl acrylate/hydroxyethyl acrylate ("HEA")/acrylic acid ("AA") (15/4//9/6/3/7). The polymer had a weight average molecular weight of 6000 and a polydispersity of 2.

Polymer Dispersant 10

Polymer Dispersant 10 is a comb dispersant polymer made using the SCT method and is similar to Polymer Dispersant 2. The resulting branched copolymer solution had a solids content of 60% and the following polymer composition: [60] BA/BZMA/DMAEMA (60/20/20)//[40] BMA/MMA/HEMA /MAA (40/28/12/20).

Polymer Dispersant 11

Polymer Dispersant 12 is a comb dispersant polymer made using the SCT method as described in the preparation of Polymer Dispersant 3. The resulting branched copolymer solution had no aromatic functional groups and a solids content of 60% and polymer composition: [69] BA/MA/AA (45.5/45.5/9)//[31 ] MMA/MAA (71.25/28.75).

Polymer Dispersant 12

Polymer Dispersant 12 is a random acrylic polymer of MMA, BA, AA, and mercaptoethanol ("2-MERE") in a ratio of 54.9/33.6/9.8/1.7 having a weight average molecular weight of 8,000, a number average molecular weight of 4,000, and a polydispersity of 2. This polymer was made using a standard anionic polymerization process as described in U.S. Pat. No. 4,656,226, herein incorporated by reference. The polymer solution was diluted with deionized water to a solids content of 35% prior to use.

Pigment Milling

The polymer dispersants described above were used to make conditioned organic pigments for which coloristic properties are reported in the tables. Examples 1 to 13 illustrate the use of acrylic polymer dispersants with perylene pigments according to the invention. Comparison Example 1 illustrates the preparation of a pigment composition by physically mixing an acrylic polymer dispersant with a perylene pigment.

Examples 14 and 15 illustrate the use of acrylic polymer dispersants with quinacridone pigments. Comparison Examples 2 and 3 illustrate the preparation of pigment compositions by physically mixing an acrylic polymer dispersant with quinacridone pigments.

Comparison Example 1

A 50 g portion of crude N,N-dimethylperylenediimide was stirred with 27.7 g of Polymer Dispersant 1(15% active on pigment) in 200 ml of water for 1 hour. The suspension was acidified to less than pH 3 with concentrated HCl and stirred for an additional hour. The pigment was collected by vacuum filtration, washed free of acid, dried in an oven at 80° C., and ground in a blender to yield approximately 57 g of conditioned comparison pigment.

Test results are given in Table 1.

Example 1

A 200 g portion of crude N,N-dimethylperylenediimide pigment (C.I. Pigment Red 179) was combined with 111 g of Polymer Dispersant (15% active on pigment) in 900 g of water. The slurry was stirred for one hour to generate a homogeneous slurry. The slurry was added to a horizontal media mill charged with 0.3 to 0.4 mm zirconium silicate beads and milled for six hours. After the milling was complete, the mill was discharged and rinsed with water and the combined slurry and wash water was acidified with concentrated hydrochloric acid until the pigment flocculated (as observed by thickening, pH less than about 4). The flocculated slurry was stirred for one hour and the pigment was collected by vacuum filtration. The pigment was washed free of acid, dried in an oven at 80° C., and ground in a blender to yield 213 g of conditioned pigment.

Test results are given in Table 1.

Example 2

The procedure of Example 1 was followed with the following exceptions: 300 g of crude perylene pigment and 166.6 g of Polymer Dispersant 1 (15% active on-pigment) were slurried initially in 1200 g of water. The slurry was milled for four hours. After one hour of milling, a defoamer (available as Byk 023 from BYK-Chemie) was added. After the milling, the discharged slurry was divided in half. The first half was acidified to pH 4.1 with concentrated HC1. The sample was filtered, washed, and dried at 60° C. A total of 151 g of conditioned pigment was obtained.

Test results are given in Table 1.

Example 3

The second half of the milled slurry from Example 2 was treated with 10 g of calcium chloride dihydrate in 20 mL of water. The sample was filtered, washed, and dried at 60° C. A total of 152.7 g of calcified conditioned pigment was obtained.

Test results are given in Table 1.

Example 4

The procedure of Example I was followed with the following exceptions:

200 g of crude perylene pigment was slurried with 37 g of acrylic latex (32.7% solids in an aqueous medium of an allyl methacrylate/methyl methacrylate/methacrylic acid/hydoxyethyl acrylate/butyl acrylate polymer, 5% active on pigment) and 74 g of Polymer Dispersant 1 (10% active on pigment). The slurry was milled for six hours. The discharged slurry was acidified to pH 2.2, filtered, washed, and dried. A total of 215 g of dry conditioned pigment was obtained.

Test results are given in Table 1.

Example 5

The procedure of Example 1 was followed with the following exceptions:

250 g of crude perylene pigment was slurried with 59.6 g of Polymer Dispersant 2 (15% active on pigment) in 880 g of water. The sample was milled for six hours, after which the pigment slurry was discharged, acidified to pH 4 with concentrated HCl, and isolated as described above. A total of 231 g of conditioned pigment was obtained.

Test results are given in Table 1.

Example 6

The procedure of Example 1 was followed with the following exceptions: 250 g of crude perylene pigment was slurried with 107 g of Polymer Dispersant 3 (15% active on-pigment) in 1000 g of water. The sample was milled for five hours, after which the pigment slurry was discharged, acidified to pH 2.1 with concentrated HC 1, and isolated as described above. A total of 279 g of conditioned pigment was obtained.

Test results are given in Table 1.

Example 7

The procedure of Example 1 was followed with the following exceptions:

250 g of crude perylene pigment was slurried with 85.7 g of Polymer Dispersant 4 (12% active on pigment) in 1000 g of water. The sample was milled for six hours total. After 2.5 hours of milling, additional dispersant was added gradually over the remaining 3.5 hours of milling as the slurry thickened to reduce the slurry viscosity.

Another 79 g of dispersant (28 g active, an additional 1 1% active on pigment) was added, bringing the total amount of dispersant to 23% active on pigment. The pigment was isolated as described above. Approximately 270 g of conditioned pigment was obtained.

Test results are given in Table 1.

Example 8

The procedure of Example 1 was followed with the following exceptions: 250 g of crude perylene pigment was slurried with 107 g of Polymer Dispersant 6 (15% active on pigment) in 880 g of water. The sample was milled for six hours, after which the pigment slurry was discharged, acidified to pH 4 with concentrated HCl, and isolated as described above. A total of 263 g of conditioned pigment was obtained.

Test results are given in Table 1.

Example 9

The procedure of Example 1 was followed with the following exceptions: 250 g crude perylene pigment was slurried with 89.3 g of Polymer Dispersant 8 (42% solids, 15% active on pigment) in 880 g of water. The sample was milled for six hours, after which the pigment slurry was discharged, acidified to pH 4 with concentrated HCl, and isolated as described above. A total of 226 g of conditioned pigment was obtained.

Test results are given in Table 1.

Example 10

The procedure of Example 1 was followed with the following exceptions: 250 g of crude perylene pigment was slurried with 87.5 g of Polymer Dispersant 9 (35% solids, 12.3% active on pigment) in 880 g of water. The sample was milled for six hours, after which the pigment slurry was discharged, acidified to pH 4 with concentrated HCl, and isolated as described above. A total of 229 g of conditioned pigment was obtained.

Test results are given in Table 1.

Example 11

The procedure of Example 1 was followed with the following exceptions:

250 g of crude perylene pigment was slurried with 62.5 g of Polymer Dispersant 10 (60% solids, 15% active on pigment) in 880 g of water. The sample was milled for six hours, after which the pigment slurry was discharged, acidified to pH 4 with concentrated HCl, and isolated as described above. A total of 239 g of conditioned pigment was obtained.

Test results are given in Table 1.

Example 12

The procedure of Example 1 was followed with the following exceptions:

350 g of crude perylene pigment was slurried with 148 g of Polymer Dispersant 11 (35.48% solids, 15% active on pigment) in 700 g water. The sample was milled for 5 hours, after which the pigment slurry was discharged and spray dried, yielding 347.6 g of conditioned pigment.

Example 13

A 250 g portion of crude N,N-dimethylperylenediimide was combined with 106.7 g of Polymer Dispersant 12 in 1000 g of water. The slurry was stirred for one hour to generate a homogeneous slurry. The sample was milled for six hours, after which the pigment slurry was discharged, acidified to pH 2 with concentrated HCl, and isolated as described above. A total of 250 g of conditioned pigment was obtained.

Test results are given in Table 1.

Comparison Example 2

A 25 g portion of crude dichloroquinacridone pigment isolated in crude form from methanol was stirred with 13.9 g of Polymer Dispersant 1 (15% active on pigment) in 100 ml of water for 1 hour. The suspension was acidified to less than pH 1.9 with concentrated HCl and stirred for an additional hour. The pigment was collected by vacuum filtration, washed free of acid, dried in an oven at 800 C, and ground in a blender to yield approximately 29.1 g of conditioned comparison pigment.

Test results are given in Table 2.

Example 14

The procedure of Example 1 was followed with the following exceptions: 200 g of crude dichloroquinacridone pigment (C.I. Pigment Red 202) isolated in crude form from methanol and 111 g of Polymer Dispersant 1 (15% active on pigment) were slurried in 800 g of water. To the slurry was added 1 g of Surfynol 104 defoamer and 3 g of AMP-95. The slurry was milled for five hours. During the milling, the slurry thickened considerably. An additional 28.32 g of Polymer Dispersant 1 (3.8% active on pigment, bringing the total loading to 18.8% on pigment) and water were added such that the total solids in the slurry was 10% by weight. After the milling, the discharged slurry was acidified to pH 2.0 with concentrated HCl and isolated as described above. A total of 226 g of conditioned pigment was obtained.

Test results are given in Table 2.

Comparison Example 3

A 20 g portion of crude dichloroquinacridone pigment isolated in crude form from water was stirred with 11.1 g of Polymer Dispersant 1 (15% active on pigment) and 0.03 g of Surfynol 104 defoamer in 100 g of water for 1 hour. The suspension was acidified to less than pH 2.5 with concentrated HCl and stirred for an additional hour. The pigment was collected by vacuum filtration, washed free of acid, dried in an oven at 80° C., and ground in a blender to yield approximately 24.7 g of conditioned comparison pigment.

Test results are given in Table 3.

Example 15

The procedure of Example 1 was followed with the following exceptions:

200 g of crude dichloroquinacridone pigment isolated in crude form from water and 111 g of Polymer Dispersant 1 (15% active on pigment) were slurried in 800 g of 5 water. To the slurry was added 0.25 g of Surfynol 104 defoamer. The slurry was milled for five hours. During the milling, the slurry thickened considerably. An additional 37 g of Polymer Dispersant 1 (5% active on pigment, bringing the total loading to 20% on pigment) was added. After the milling, the discharged slurry was acidified to pH 2.1 with concentrated HC 1 and isolated as described above. A total of 230 g of conditioned pigment was obtained.

Test results are given in Table 3.

Paint Testing

The organic pigments described above were used to prepare paints for testing as follows:

Water-based paint tests were carried out using a waterborne basecoat/solvent-borne clearcoat paint system. Aqueous pigment dispersions were prepared in an Eiger mill using a mixture of 12.4% AROLON® 559-G4-70 acrylic resin (Reichhold Chemicals, Inc.), 3.2% SOLSPERSE® 27000 hyperdispersant (Zeneca, Inc.), 1.6% 2-amino-2-methyl-1-propanol (Angus Chemical), and 18% conditioned organic pigment, which gave a pigment-to-binder ratio of 3:2 and a total solids content of 30%. The pigment-to-binder ratio was then reduced to 1:4 with additional AROLON® 559-G4-70 acrylic resin (total amount 26%) and 25% CYMEL® 325 melamine/formaldehyde resin (Cytec Industries), which gave a total solids content of 50%. Masstone and transparency measurements were made using films applied at 76 μm and 38 μm wet film thickness, respectively, and allowed to stand at room temperature for fifteen minutes and at 100° C. for five minutes. Clearcoats containing a mixture of 80% of AROPLAZ® 1453-X-50 alkyd resin (Reichhold Chemicals, Inc.) and 20% CYMEL® 325 melamine/formaldehyde resin at a total solids level of 57% were then applied over the basecoat at a 76 μm wet film thickness and allowed to stand at room temperature for fifteen minutes and at 121° C. for fifteen minutes.

Undertone tint paints were prepared from the reduced aqueous dispersions described above having a pigment-to-binder ratio of 1:4 by adding additional AROLON® 559-G4-70 acrylic resin, CYMEL® 325 melamine/formaldehyde resin, and 35% TINT-AYD® CW-5003 white dispersion (Daniel Products Company), which gave a pigment-to-binder ratio of 1: 1.1, a total solids content of 55%, and a $TiO_2$-to-pigment ratio of 9:1. Color measurements were made using films applied at 38 μm wet film thickness and allowed to stand at room temperature for fifteen minutes and at 100° C. for five minutes. Clearcoats were then applied and baked as described above.

Metallic paints were prepared from the dispersion described above having a pigment-to-binder ratio of 3:2 using a water-dispersible aluminum pigment (available as HYDRO PASTE® 8726 from Silberline Manufacturing Co., Inc.), AROLON® 559-G4-70 acrylic resin, and CYMEL® 325 melamine/formaldehyde resin in quantities that provided a pigment-to-binder ratio of 1:2, an aluminum-to-pigment ratio of 1:4, and a total solids content of 43%. Color measurements were made using films applied at 38 μm wet film thickness and baked as described above. Clearcoats were then applied and baked as described above.

The coloristic values for paints containing the conditioned organic pigments were obtained on a CS-5 Chroma Sensor spectrometer from Datacolor International using a D65 illuminant at an angle of 10 degrees. All values for $\Delta L$, $\Delta H$, $\Delta C$, and transparency were measured relative to corresponding crude organic pigment that has not been treated with an acrylic polymer dispersant. Positive values for $\Delta L$, $\Delta H$, $\Delta C$, and transparency correspond to lighter, yellower, more chromatic, and more transparent samples, respectively. Subjective qualitative evaluations of flop were determined by a skilled observer.

The above results show that pigments prepared according to the process of this invention provide improved color and aesthetics when used in aqueous paint formulations. Such improvements include higher chromaticity, transparency, tint strength, hue, and flop when compared to existing controls.

Milling of end-use pigment dispersions, which are used to make such end-use paint formations, is also improved. Specifically, use of the pigments of the invention results in a reduction in dispersion milling time of about 25 to 50%. Milling ease is facilitated by this invention, since incorporation of acrylic copolymer dispersants during pigment manufacture prevents hard pigment agglomeration during drying procedures.

Further testing of modified pigments of the above examples in more complex aqueous basecoat formulations used for automotive finish applications demonstrated similarly improved performance. Moreover, acrylic copolymer dispersants having one or more aromatic functional groups in the adsorption portions of the polymer were preferred.

TABLE 1

Test results for perylene, pigment compositions of Examples 1–12

| Example | Polymer Dispersant | Masstone | | | Undertone | | | | Metallic | | | | Flop |
|---|---|---|---|---|---|---|---|---|---|---|---|---|---|
| | | $\Delta L$ | $\Delta C$ | Trans. | $\Delta L$ | $\Delta H$ | $\Delta C$ | % str. | $\Delta L$ | $\Delta H$ | $\Delta C$ | % str. | |
| Comp. 1 | 1 (phys. mix) | 0.82 | 0.96 | — | 2.26 | −0.17 | −0.95 | 84.07 | — | — | — | — | light |
| 1 | 1 | −0.81 | −4.63 | 3.26 | 0.95 | 1.88 | 4.48 | 99.81 | 3.08 | 1.72 | 12.12 | 102.08 | deep |
| 2 | 1 | −0.54 | −3.59 | 0.83 | 1.03 | 1.51 | 3.97 | 101.76 | 2.53 | 1.46 | 9.68 | 101.87 | deep |
| 3 | 1 | −0.30 | −2.70 | 0.18 | 0.80 | 1.12 | 3.87 | 103.29 | 2.19 | 1.33 | 9.09 | 103.17 | deep |
| 4 | 1 | −0.51 | −3.31 | 1.53 | 1.56 | 1.57 | 3.66 | 94.96 | 2.38 | 1.59 | 10.52 | 100.54 | deep |
| 5 | 2 | −0.44 | −2.69 | 1.90 | 1.12 | 1.06 | 3.72 | 104.23 | 2.18 | 1.45 | 9.74 | 101.75 | deep |
| 6 | 3 | −0.77 | −4.76 | 1.10 | 1.34 | 1.49 | 2.97 | 99.49 | 2.43 | 1.78 | 10.80 | 101.67 | deep |
| 7 | 4 | −0.68 | −4.03 | 2.86 | 2.81 | 1.55 | 4.05 | 93.30 | 3.34 | 1.63 | 11.78 | 101.51 | deep |
| 8 | 6 | −0.44 | −3.16 | 2.67 | 1.75 | 1.01 | 2.95 | 98.30 | 2.53 | 1.34 | 10.25 | 100.27 | deep |
| 9 | 8 | −0.89 | −5.04 | 4.76 | 1.37 | 1.24 | 3.86 | 102.83 | 2.65 | 1.66 | 10.93 | 101.49 | deep |
| 10 | 9 | −0.26 | −2.51 | 0.39 | 0.70 | 0.99 | 4.13 | 107.83 | 1.77 | 1.17 | 9.35 | 102.76 | deep |
| 11 | 10 | −0.54 | −3.58 | 1.96 | 1.19 | 0.80 | 3.70 | 103.63 | 2.03 | 1.15 | 10.20 | 102.40 | deep |
| 12 | 11 | −1.30 | −6.86 | 2.25 | 0.68 | 2.29 | 2.25 | 100.62 | 3.22 | 2.19 | 9.88 | 103.05 | deep |
| 13 | 12 | −1.16 | −6.25 | 0.88 | 0.58 | 2.52 | 1.93 | 101.25 | 3.30 | 2.35 | 10.38 | 103.51 | deep |

TABLE 2

Test results for the quinacridone pigment composition of Example 14

| Example | Polymer Dispersant | Masstone | | | Undertone | | | | Metallic | | | | Flop |
|---|---|---|---|---|---|---|---|---|---|---|---|---|---|
| | | $\Delta L$ | $\Delta C$ | Trans. | $\Delta L$ | $\Delta H$ | $\Delta C$ | % str. | $\Delta L$ | $\Delta H$ | $\Delta C$ | % str. | |
| Comp. 2 | 1 (phys. mix) | −0.13 | −0.70 | 2.76 | 0.00 | −0.03 | 0.19 | 89.34 | 0.57 | −1.76 | 0.19 | 94.13 | neutral |
| 14 | 1 | −1.87 | −9.12 | 10.71 | 0.98 | −1.08 | 0.80 | 99.91 | 2.31 | −2.63 | 4.76 | 98.39 | deep |

TABLE 3

Test results for the quinacridone pigment composition of Example 15

| Example | Polymer Dispersant | Masstone | | | Undertone | | | | Metallic | | | | Flop |
|---|---|---|---|---|---|---|---|---|---|---|---|---|---|
| | | $\Delta L$ | $\Delta C$ | Trans. | $\Delta L$ | $\Delta H$ | $\Delta C$ | % str. | $\Delta L$ | $\Delta H$ | $\Delta C$ | % str. | |
| Comp. 3 | 1 (phys. mix) | 0.01 | 0.29 | 1.60 | −0.41 | 1.16 | 0.03 | 82.64 | −0.33 | 0.13 | −1.06 | 92.24 | neutral |
| 15 | 1 | −5.32 | −22.86 | 21.64 | 1.99 | −2.44 | −0.65 | 114.39 | 5.11 | 0.98 | 9.23 | 106.23 | deep |

What is claimed is:

1. A process for preparing conditioned organic pigments comprising
   (a) wet milling a mixture comprising:
      (1) one or more crude organic pigments;
      (2) at least about 0.1% by weight, relative to the organic pigment, of one or more acrylic copolymer dispersants; and
      (3) a positive amount to about 100 parts by weight, relative to the organic pigment, of a milling liquid in which the organic pigment is substantially insoluble; and
   (b) isolating the milled organic pigment.

2. A process according to claim 1 wherein the mixture additionally comprises
   (4) one or more milling additives; and/or
   (5) one or more surface treatment additives.

3. A process according to claim 1 additionally comprising adding after the milling step
   (6) one or more acids;
   (7) one or more divalent metal salts; and/or
   (8) one or more quaternary ammonium salts.

4. A process according to claim 1 wherein the organic pigment is a perylene, quinacridone, phthalocyanine, isoindoline, or dioxazine.

5. A process according to claim 1 wherein the acrylic copolymer dispersant contains at least one polymerized monomer having an aromatic functionality in an adsorbing segment.

6. A process according to claim 1 wherein the acrylic copolymer is a block copolymer having at least one pigment absorbing segment and at least one stabilizing segment, wherein the pigment absorbing segment includes at least one polymerized monomer having aromatic functionality.

7. A process according to claim 6 wherein the acrylic copolymer is formed from polymerized (meth)acrylic monomers.

8. A process according to claim 6 wherein the acrylic copolymer is prepared by group transfer polymerization techniques.

9. A process according to claim 6 wherein the acrylic copolymer contains hydroxyl groups in the stabilizing segment.

10. A process according to claim 1 wherein the acrylic copolymer is a graft copolymer having a macromonomer side chain grafted onto a polymer backbone, wherein either the backbone or the macromonomer includes at least one polymerized monomer having aromatic functionality.

11. A process according to claim 10 wherein the acrylic copolymer is formed from polymerized (meth)acrylic monomers.

12. A process according to claim 10 wherein the acrylic copolymer is prepared by special chain transfer techniques.

13. A process according to claim 10 wherein the graft copolymer contains hydroxyl groups on the backbone and/or the macromonomer.

14. A process according to claim 1 wherein the acrylic copolymer is random copolymer having absorbing and stabilizing segments randomly placed in the polymer chain.

15. A pigment composition prepared according to the process of claim 1.

16. A pigmented coating composition containing as pigment a pigment composition prepared according to claim 1.

17. An aqueous pigment dispersion comprising a conditioned organic pigment prepared by the process according to claim 1 in an aqueous liquid medium.

18. A coating composition comprising a pigment dispersion according to claim 17 and an aqueous liquid medium.

19. The process of claim 1 wherein the milling liquid is present in an amount of 1 to 15 parts by weight, relative to the organic pigment.

20. The process of claim 5 wherein the milling liquid is present in an amount of 1 to 15 parts by weight, relative to the organic pigment.

* * * * *